United States Patent
Kim et al.

(10) Patent No.: US 10,686,914 B2
(45) Date of Patent: Jun. 16, 2020

(54) AUTOMATIC SELECTION OF MAC PROTOCOL TO SUPPORT MULTIPLE PRIME PLC STANDARDS

(71) Applicant: Texas Instruments Incorporated, Dallas, TX (US)

(72) Inventors: Wonsoo Kim, Allen, TX (US); Mehul Soman, Dallas, TX (US); Anuj Batra, Mountain View, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 54 days.

(21) Appl. No.: 14/836,443

(22) Filed: Aug. 26, 2015

(65) Prior Publication Data
US 2016/0127515 A1 May 5, 2016

Related U.S. Application Data

(60) Provisional application No. 62/074,979, filed on Nov. 4, 2014.

(51) Int. Cl.
*H04L 29/06* (2006.01)
*H04L 29/08* (2006.01)
*H04B 3/54* (2006.01)

(52) U.S. Cl.
CPC ............ *H04L 69/18* (2013.01); *H04B 3/544* (2013.01); *H04L 67/12* (2013.01); *H04B 2203/5408* (2013.01); *H04B 2203/5433* (2013.01); *Y04S 40/18* (2018.05)

(58) Field of Classification Search
CPC ...... H04L 12/2803; H04L 67/12; H04L 69/18
See application file for complete search history.

(56) References Cited

U.S. PATENT DOCUMENTS

| | | | | |
|---|---|---|---|---|
| 7,616,762 B2 * | 11/2009 | Doumuki | ............... | H04B 3/542 370/445 |
| 8,594,034 B2 * | 11/2013 | Liu | ......... | H04W 48/12 370/329 |
| 8,605,651 B2 * | 12/2013 | Bertani | ................. | H04W 74/02 370/328 |

(Continued)

OTHER PUBLICATIONS

"Narrowband Orthogonal Frequency Division Multiplexing Power Line Communication Transceivers for G3-PLC Networks" ITU-T Recommendation G.9903, Series G: Transmission Systems and Media, Digital Systems and Networks, Access Networks—In Premises Networks ITU-T Telecommunication Standardization Sector of ITU, Feb. 2014, pp. 1-226.

(Continued)

*Primary Examiner* — Asad M Nawaz
*Assistant Examiner* — Berhanu D Belete
(74) *Attorney, Agent, or Firm* — Brian D. Graham; Charles A. Brill; Frank D. Cimino (57) ABSTRACT

A communication device in a network may receive a stream of frames from the network, in which each frame includes one or more beacon packets. A communication protocol being used by the network may be identified by tracking a preselected field within a sequence of beacon packets, in which the preselected field varies in a first known manner for a first protocol and in a second known manner for a second protocol. The communication device may then join to the network using the identified communication protocol to transmit and receive data.

14 Claims, 8 Drawing Sheets

(56) References Cited

U.S. PATENT DOCUMENTS

| | | | | |
|---|---|---|---|---|
| 8,787,195 B2* | 7/2014 | Vijayasankar | ......... | H04B 3/542 370/252 |
| 9,843,985 B2* | 12/2017 | Mainaud | ............ | H04L 43/0823 |
| 2004/0068484 A1* | 4/2004 | J'maev | ................. | G06Q 10/08 |
| 2005/0127867 A1* | 6/2005 | Calhoon | .................... | G06F 1/26 320/108 |
| 2005/0201339 A1* | 9/2005 | Mangin | ................. | H04L 1/0001 370/337 |
| 2006/0291425 A1* | 12/2006 | Park | ................. | H04W 36/0011 370/331 |
| 2009/0161578 A1* | 6/2009 | Yeung | .................... | H04L 45/00 370/254 |
| 2010/0189005 A1* | 7/2010 | Bertani | ................. | H04W 74/02 370/252 |
| 2011/0043340 A1* | 2/2011 | Kim | ...................... | H04L 1/0041 375/260 |
| 2011/0116500 A1* | 5/2011 | Petry | .................... | H04L 65/601 370/389 |
| 2011/0125432 A1* | 5/2011 | Pomerantz | ........... | G05B 19/058 702/62 |
| 2012/0147099 A1* | 6/2012 | Wang | .................. | B41J 2/14233 347/71 |
| 2012/0147899 A1* | 6/2012 | Du | ........................ | H04L 12/413 370/447 |
| 2012/0155487 A1* | 6/2012 | Du | ........................ | H04B 3/544 370/445 |
| 2012/0182881 A1* | 7/2012 | Ananthakrishnan | ... | H04B 3/542 370/244 |
| 2012/0189042 A1* | 7/2012 | Varadarajan | ........... | H04B 3/542 375/222 |
| 2012/0275326 A1* | 11/2012 | Vedantham | ............ | H04B 3/544 370/252 |
| 2012/0294377 A1* | 11/2012 | Vijayasankar | ......... | H04B 3/542 375/257 |
| 2013/0051446 A1* | 2/2013 | Vijayasankar | ........... | H04B 3/54 375/224 |
| 2013/0094597 A1 | 4/2013 | Vijayasankar et al. | | |
| 2013/0136132 A1 | 5/2013 | Abbot et al. | | |
| 2013/0148746 A1* | 6/2013 | Vedantham | .............. | H04B 3/54 375/257 |
| 2013/0170336 A1* | 7/2013 | Chen | ........................ | H04L 12/44 370/221 |
| 2014/0105313 A1 | 4/2014 | Kim et al. | | |
| 2014/0112398 A1* | 4/2014 | Kamalizad | .......... | H04L 27/2655 375/257 |
| 2014/0119233 A1* | 5/2014 | Palani | .................... | H04B 3/544 370/254 |
| 2014/0254349 A1* | 9/2014 | Jia | ......................... | H04L 5/0055 370/225 |
| 2014/0254609 A1* | 9/2014 | Petry | ..................... | H04L 65/601 370/466 |
| 2015/0323582 A1* | 11/2015 | Pigeon | ..................... | H04B 3/54 324/86 |

OTHER PUBLICATIONS

Jim Leclare, Arahin Niktash, and Victor Levi, "An Overview, History, and Formation of IEEE P1901.2 for Narrowband OFDM PLC", Maxim Integrated, Application Note 5676, Jul. 2, 2013, pp. 1-7.

"Draft Specification for PoweRline Intelligent Metering Evolution", Prime Alliance, R1.3.6, Apr. 2013, pp. 1-251.

"Specification for PoweRline Intellignet Metering Evolution", Prime Alliance, R1.4, Oct. 31, 2014, pp. 1-338.

International Search Report for corresponding PCT Application No. PCT/US2015/059054, dated Feb. 25, 2016.

* cited by examiner

AUTOMATIC SELECTION OF MAC PROTOCOL TO SUPPORT MULTIPLE PRIME PLC STANDARDS

CLAIM OF PRIORITY UNDER 35 U.S.C. 119(e)

The present application claims priority to and incorporates by reference U.S. Provisional Application No. 62/074,979, filed Nov. 4, 2014, entitled "Automatic Selection Of Mac Protocol To Support Multiple Prime PLC Standards."

FIELD OF THE INVENTION

This invention generally relates to reliable communication between devices, and in particular to communication over power lines.

BACKGROUND OF THE INVENTION

Power Line Communication (PLC) is one of the technologies used for automatic meter reading, for example. Both one-way and two-way systems have been successfully used for decades. Interest in this application has grown substantially in recent history because utility companies have an interest in obtaining fresh data from all metered points in order to better control and operate the utility grid. PLC is one of the technologies being used in Advanced Metering Infrastructure (AMI) systems.

A PLC carrier repeating station is a facility at which a PLC signal on a power line is refreshed. The signal is filtered out from the power line, demodulated and modulated, and then re-injected onto the power line again. Since PLC signals can carry long distances (several 100 kilometers), such facilities typically exist on very long power lines using PLC equipment.

In a one-way system, readings "bubble up" from end devices (such as meters), through the communication infrastructure, to a "master station" which publishes the readings. A one-way system might be lower-cost than a two-way system, but also is difficult to reconfigure should the operating environment change.

In a two-way system, both outbound and inbound traffic is supported. Commands can be broadcast from a master station (outbound) to end devices, such as meters, that may be used for control and reconfiguration of the network, to obtain readings, to convey messages, etc. The device at the end of the network may then respond (inbound) with a message that carries the desired value. Outbound messages injected at a utility substation may propagate to all points downstream. This type of broadcast allows the communication system to simultaneously reach many thousands of devices. Control functions may include monitoring health of the system and commanding power shedding to nodes that have been previously identified as candidates for load shed. PLC also may be a component of a Smart Grid.

The power line channel is very hostile. Channel characteristics and parameters vary with frequency, location, time and the type of equipment connected to it. The lower frequency regions from 10 kHz to 200 kHz are especially susceptible to interference. Furthermore, the power line is a very frequency selective channel. Besides background noise, it is subject to impulsive noise often occurring at 50/60 Hz, and narrowband interference and group delays up to several hundred microseconds.

OFDM is a modulation technique that can efficiently utilize this limited low frequency bandwidth, and thereby allows the use of advanced channel coding techniques. This combination facilitates a very robust communication over a power line channel.

On Sep. 30, 2010, the IEEE's 1901 Broadband Powerline Standard was approved and HomePlug AV, as baseline technology for the FFT-OFDM PHY within the standard, is now ratified and validated as an international standard. The HomePlug Powerline Alliance is a certifying body for IEEE 1901 products. The three major specifications published by HomePlug (HomePlug AV, HomePlug Green PHY and HomePlug AV2) are interoperable and compliant.

Another set of open standards has been developed for power line communication (PLC) at the request of Electricité Réseau Distribution France (ERDF), a wholly owned subsidiary of the EDF (Electricité de France) Group. The set of standards include "PLC G3 Physical Layer Specification," and "PLC G3 MAC Layer Specification." These standards are intended to facilitate the implementation of an automatic meter-management (AMM) infrastructure in France; however, PLC using these standards or similar technology may be used by power utilities worldwide. The G3 set of standards have been approved as international standard ITU G.9903.

The G3 standards promote Interoperability and coexists with IEC 61334, IEEE® P1901, and ITU G.hn systems. 10 kHz to 490 kHz operation complies with FCC, CENELEC, and ARIB. CENELEC is the European Committee for Electrotechnical Standardization and is responsible for standardization in the electro technical engineering field. ARIB is a Japanese standards organization.

"PRIME" (PoweRline Intelligent Metering Evolution) PLC technology is an OFDM based technology using the CENELEC A-Band that was approved as international standard ITU G.9904. "Draft Specification for PoweRline Intelligent Metering Evolution" April 2013 is incorporated by reference herein. PRIME version 1.3.6 has been deployed in millions of smart meters in multiple countries. PRIME R1.4 introduced new features as well as extended the full 500 kHz FCC and ARIB spectrums to better address American and Asian market needs. The R1.4 specification aims to ensure the interoperability of products and backward compatibility with the currently installed base of millions of meters, corresponding data concentrators, and gateways based on PRIME Specification 1.3.6.

BRIEF DESCRIPTION OF THE DRAWINGS

Particular embodiments in accordance with the invention will now be described, by way of example only, and with reference to the accompanying drawings.

Other features of the present embodiments will be apparent from the accompanying drawings and from the detailed description that follows.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description Power line communication (PLC) devices operate in the presence of harsh channel and noise environments, such as frequency-selective channels, narrowband interference, and impulsive noise. PRIME is narrowband OFDM based PLC standard. Currently, PLC modems based on PRIME spec R1.3.6 have been deployed in multiple electric grids across the globe in various regions of Europe, Asia, and South America, for example. To increase the connectivity and improve performance the PRIME alliance introduced a new PRIME spec R1.4 with enhancements at both the media access control layer (MAC) and physical layer (PHY). The R1.4 specification also describes a backward compatibility mode to operate with existing PRIME R1.3.6 modes, which will be referred to herein as R1.4BC (backward compatible).

The existence of two versions of the PRIME specification introduces a problem for a single modem able to connect to an existing PRIME 1.3.6 network or to the new PRIME 1.4 only network, which will be referred to as "green field" (GF) in this disclosure. This is because there are advantages to operating in the green field mode as opposed to the backwards compatible mode. In this disclosure, a method will be described which enables a node to automatically detect which network it is connected to and to select the MAC protocol accordingly.

PLC Overview

Figure 1:
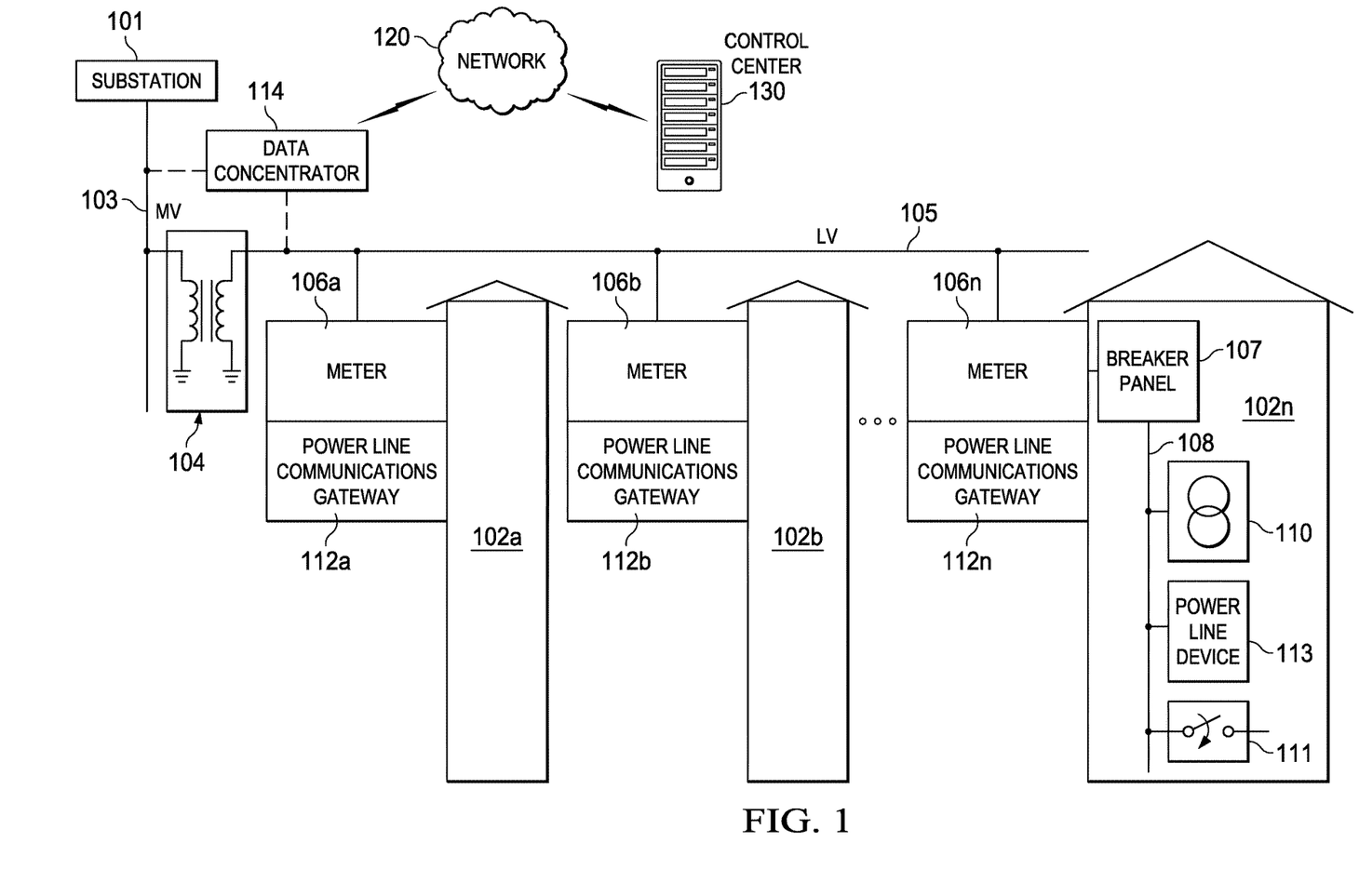
FIG. 1 is a conceptual diagram of a PLC system network.

FIG. 1 is a conceptual diagram of a PLC system in which an electric power distribution system is depicted. Medium voltage (MV) power lines 103 from substation 101 typically carry voltage in the tens of kilovolts range. Transformer 104 steps the MV power down to low voltage (LV) power on LV lines 105, carrying voltage in the range of 100-240 VAC. Transformer 104 is typically designed to operate at very low frequencies in the range of 50-60 Hz. Transformer 104 does not typically allow high frequencies, such as signals greater than 100 KHz, to pass between LV lines 105 and MV lines 103. LV lines 105 feed power to customers via meters 106a-n, which are typically mounted on the outside of residences 102a-n. Although referred to as "residences," premises 102a-n may include any type of building, facility, or location where electric power is received and/or consumed. A breaker panel, such as panel 107, provides an interface between meter 106n and electrical wires 108 within residence 102n. Electrical wires 108 deliver power to outlets 110, switches 111, and other electric devices within residence 102n.

The power line topology illustrated in FIG. 1 may be used to deliver high-speed communications to residences 102a-n. In some implementations, power line communications modems or gateways 112a-n may be coupled to LV power lines 105 at meter 106a-n. PLC modems/gateways 112a-n may be used to transmit and receive data signals over MV/LV lines 103/105. Such data signals may be used to support metering and power delivery applications (e.g., smart grid applications), communication systems, high speed Internet, telephony, video conferencing, and video delivery, to name a few. By transporting telecommunications and/or data signals over a power transmission network, there is no need to install new cabling to each subscriber 102a-n. Thus, by using existing electricity distribution systems to carry data signals, significant cost savings are possible.

An illustrative method for transmitting data over power lines may use, for example, a carrier signal having a frequency different from that of the power signal. The carrier signal may be modulated by the data, for example, using an orthogonal frequency division multiplexing (OFDM) scheme or the like. The examples described below are based on PRIME, IEEE 1901.2 or G3-PLC, however, other embodiments may use other OFDM based protocols now known or later developed.

PLC modems or gateways 112a-n at residences 102a-n use the MV/LV power grid to carry data signals to and from PLC data concentrator 114 without requiring additional wiring. Concentrator 114 may be coupled to either MV line 103 or LV line 105. Modems or gateways 112a-n may support applications such as high-speed broadband Internet links, narrowband control applications, low bandwidth data collection applications, or the like. In a home environment, for example, modems or gateways 112a-n may further enable home and building automation in heat and air conditioning, lighting, and security. Also, PLC modems or gateways 112a-n may be used to control AC or DC charging of electric vehicles and other appliances. PLC device 113 is an example device that is representative of one or more PLC devices that may be deployed within a residence or office, for example. Outside the premises, power line communication networks may provide street lighting control and remote power meter data collection, for example.

One or more data concentrators 114 may be coupled to control center 130 (e.g., a utility company) via network 120. Network 120 may include, for example, an IP-based network, the Internet, a cellular network, a WiFi network, a WiMax network, or the like. As such, control center 130 may be configured to collect power consumption and other types of relevant information from gateway(s) 112 and/or device(s) 113 through concentrator(s) 114. Additionally or alternatively, control center 130 may be configured to implement smart grid policies and other regulatory or commercial rules by communicating such rules to each gateway(s) 112 and/or device(s) 113 through concentrator(s) 114.

In some embodiments, each concentrator 114 may be seen as a base node for a PLC domain, each such domain comprising downstream PLC devices that communicate with control center 130 through a respective concentrator 114. For example, in FIG. 1, device 106a-n, 112a-n, and 113 may all be considered part of the PLC domain that has data concentrator 114 as its base node; although in other scenarios other devices may be used as the base node of a PLC domain. In a typical situation, multiple nodes may be deployed in a given PLC network, and at least a subset of those nodes may be tied to a common clock through a backbone (e.g., Ethernet, digital subscriber loop (DSL), etc.). Further, each PLC domain may be coupled to MV line 103 through its own distinct transformer similar to transformer 104.

Still referring to FIG. 1, meters 106, gateways 112, PLC device 113, and data concentrator 114 may each be coupled to or otherwise include a PLC modem or the like. The PLC modem may include transmitter and/or receiver circuitry to facilitate the device's connection to power lines 103, 105, and/or 108.

Figure 2:
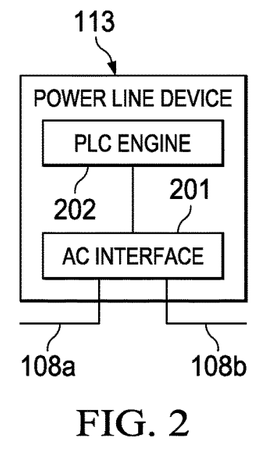
FIG. 2 is a block diagram of an example PLC device or modem for use in the PLC system of FIG. 1.

FIG. 2 is a block diagram of PLC device or modem 113 that may include an embodiment of the method for detecting network type described herein. As illustrated, AC interface 201 may be coupled to electrical wires 108a and 108b inside of premises 112n in a manner that allows PLC device 113 to switch the connection between wires 108a and 108b off using a switching circuit or the like. In other embodiments, however, AC interface 201 may be connected to a single wire 108 (i.e., without breaking wire 108 into wires 108a and 108b) and without providing such switching capabilities. In operation, AC interface 201 may allow PLC engine 202 to receive and transmit PLC signals over wires 108a-b. As noted above, in some cases, PLC device 113 may be a PLC modem. Additionally or alternatively, PLC device 113 may be a part of a smart grid device (e.g., an AC or DC charger, a meter, etc.), an appliance, or a control module for other electrical elements located inside or outside of premises 112n (e.g., street lighting, etc.). PLC device 113 may also embody a modem that is coupled to provide data transfer across the PLC network for a data device, such as a computer, tablet, or various types of sensors and actuators, for example.

PLC engine 202 may be configured to transmit and/or receive PLC signals over wires 108a and/or 108b via AC interface 201 using a particular channel or frequency band. In some embodiments, PLC engine 202 may be configured to transmit OFDM signals, although other types of modulation schemes may be used. As such, PLC engine 202 may include or otherwise be configured to communicate with metrology or monitoring circuits (not shown) that are in turn configured to measure power consumption characteristics of certain devices or appliances via wires 108, 108a, and/or 108b. PLC engine 202 may receive such power consumption information, encode it as one or more PLC signals, and transmit it over wires 108, 108a, and/or 108b to higher-level PLC devices (e.g., PLC gateways 112n, data concentrators 114, etc.) for further processing. Conversely, PLC engine 202 may receive instructions and/or other information from such higher-level PLC devices encoded in PLC signals, for example, to allow PLC engine 202 to select a particular frequency band in which to operate. PLC engine 202 may be implemented using a digital signal processor (DSP), or another type of microprocessor, that is executing control software instructions stored in memory that is coupled to the microprocessor, for example, to perform various applications for power line device 113.

Figure 3:
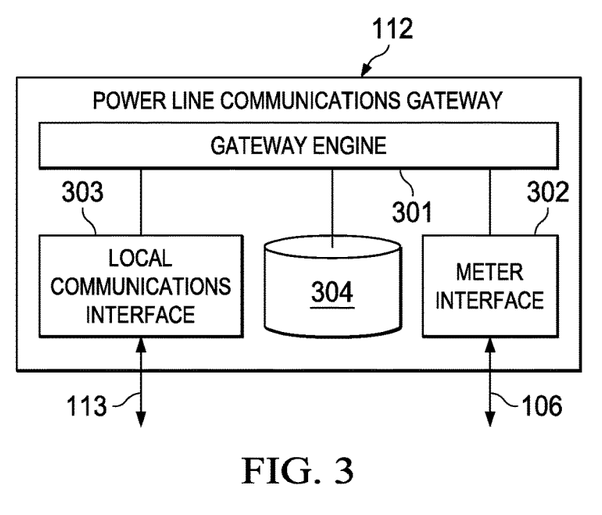
FIG. 3 is a block diagram of an example PLC gateway for use in the PLC system of FIG. 1.

FIG. 3 is a block diagram of PLC gateway 112 that may include an embodiment of the method for detecting network type described herein. As illustrated in this example, gateway engine 301 is coupled to meter interface 302, local communication interface 303, and frequency band usage database 304. Meter interface 302 is coupled to meter 106, and local communication interface 303 is coupled to one or more of a variety of PLC devices such as, for example, PLC device 113. Local communication interface 303 may provide a variety of communication protocols such as, for example, ZIGBEE, BLUETOOTH, WI-FI, WI-MAX, ETHERNET, etc., which may enable gateway 112 to communicate with a wide variety of different devices and appliances. In operation, gateway engine 301 may be configured to collect communications from PLC device 113 and/or other devices, as well as meter 106, and serve as an interface between these various devices and PLC data concentrator 114. Gateway engine 301 may also be configured to allocate frequency bands to specific devices and/or to provide information to such devices that enable them to self-assign their own operating frequencies.

In some embodiments, PLC gateway 112 may be disposed within or near premises 102n and serve as a gateway to all PLC communications to and/or from premises 102n. In other embodiments, however, PLC gateway 112 may be absent and PLC devices 113 (as well as meter 106n and/or other appliances) may communicate directly with PLC data concentrator 114. When PLC gateway 112 is present, it may include database 304 with records of frequency bands currently used, for example, by various PLC devices 113 within premises 102n. An example of such a record may include, for instance, device identification information (e.g., serial number, device ID, etc.), application profile, device class, and/or currently allocated frequency band. As such, gateway engine 301 may use database 304 in assigning, allocating, or otherwise managing frequency bands assigned to its various PLC devices. PLC gateway engine 301 may be implemented using a digital signal processor (DSP), or another type of microprocessor, that is executing control software instructions stored in memory that is coupled to the microprocessor, for example, to perform various applications for gateway device 112.

Figure 4:
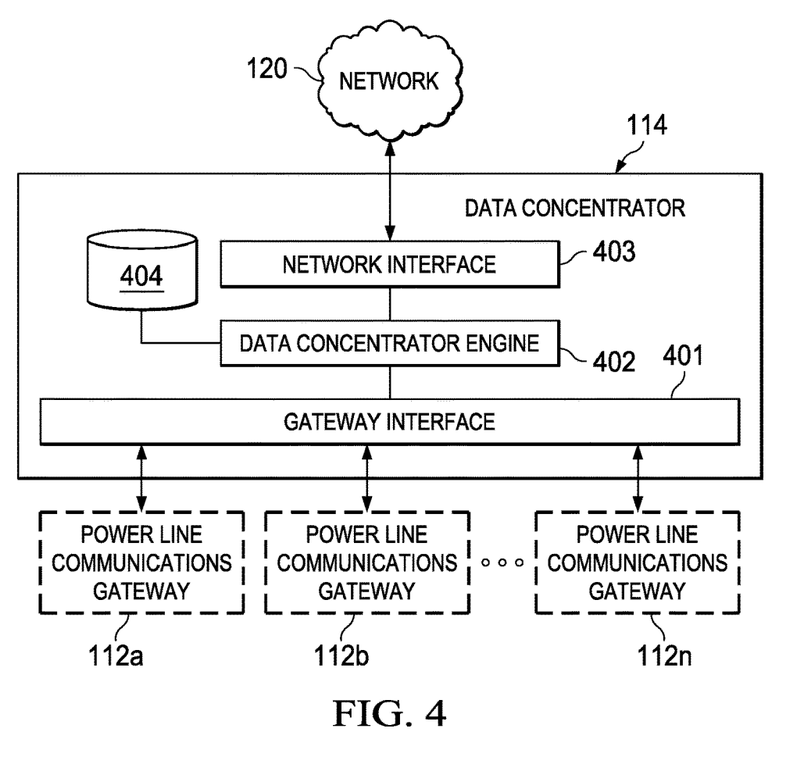
FIG. 4 is a block diagram of an example PLC data concentrator for use in the PLC system of FIG. 1.

FIG. 4 is a block diagram of a PLC data concentrator that may include an embodiment of the method for detecting network type described herein. Gateway interface 401 is coupled to data concentrator engine 402 and may be configured to communicate with one or more PLC gateways 112a-n. Network interface 403 is also coupled to data concentrator engine 402 and may be configured to communicate with network 120. In operation, data concentrator engine 402 may be used to collect information and data from multiple gateways 112a-n before forwarding the data to control center 130. In cases where PLC gateways 112a-n are absent, gateway interface 401 may be replaced with a meter and/or device interface (not shown) configured to communicate directly with meters 116a-n, PLC devices 113, and/or other appliances. Further, if PLC gateways 112a-n are absent, frequency usage database 404 may be configured to store records similar to those described above with respect to database 304.

As mentioned above, there are currently several competing PLC standards. Some of them are interoperable, while some are not. A brief overview is provided herein to illustrate various embodiments of PLC systems.

A G3-PLC device may operate in several bands: CENELEC A (35.9375-90.625 kHz), CENELEC B (98.4375-121.875 kHz), ARIB (154.6875-403.125 kHz) and FCC (154.6875-487.5 kHz) bands. In each of these bands, the critical network messages, such as network formation, routing, management, etc., are sent using either ROBO (repetition by 4) or Super ROBO (repetition by 6) mode. Power line communication using G3 standards reduces infrastructure costs by allowing transmission on medium voltage lines, for example, 12 kV, for distances of 6 km or more and across transformers with fewer repeaters. Robust operation over noisy channels is provided by an orthogonal frequency division multiplexing (OFDM)-based PHY (physical) layer. The G3 Mac specification is based on the IEEE 802.15.4-2006 "Wireless Medium Access Control (MAC) and Physical Layer (PHY) Specifications for Low-Rate Wireless Personal Area Networks (WPANs)" which is suitable for lower data rates. Two layers of forward error correction and cyber security features are provided. A 6LoWPAN adaptation layer supports IPv6 packets. An AES-128 cryptographic engine may be included in G3 PLC nodes. Adaptive tone mapping maximizes bandwidth utilization and channel estimation optimizes modulation between neighboring nodes. A mesh routing protocol selects best path between remote nodes. At the MAC layer, a data or command frame may include up to 400 bytes of data. At the PHY layer, a frame may be segmented and transmitted in smaller chunks of data.

IEEE standard 1901.2 specifies communications for low frequency (less than 500 kHz) narrowband power line devices via alternating current and direct current electric power lines. This standard supports indoor and outdoor communications in the following environments: a.) low voltage lines (less than 1000 v), such as the line between a utility transformer and meter; b) through transformer low-voltage to medium-voltage (1000 V up to 72 kV); and c) through transformer medium-voltage to low-voltage power lines in both urban and in long distance (multi-kilometer) rural communications. The standard uses transmission frequencies less than 500 kHz. Data rates will be scalable to 500 kbps depending on the application requirements. This standard addresses grid to utility meter, electric vehicle to charging station, and within home area networking communications scenarios. Lighting and solar panel power line communications are also potential uses of this communications standard. This standard focuses on the balanced and efficient use of the power line communications channel by all classes of low frequency narrow band (LF-NB) devices, defining detailed mechanisms for coexistence between different LF-NB standards developing organizations (SDO) technologies, assuring that desired bandwidth may be delivered. This standard assures coexistence with broadband power line (BPL) devices by minimizing out-of-band emissions in frequencies greater than 500 kHz. The standard addresses the necessary security requirements that assure communication privacy and allow use for security sensitive services. This standard defines the physical layer (PHY) and the medium access (MAC) sublayer of the data link layer, as defined by the International Organization for Standardization (ISO) Open Systems Interconnection (OSI) Basic Reference Model.

The PRIME technology developed by the PRIME Alliance is an OFDM based technology that was approved as international standard ITU G.9904. A PLC PHY entity may use frequencies in the band 3 kHz up to 500 kHz. The use of these frequencies is subject to applicable local regulations, e.g. EN 50065 1:2001+A1:2010 in Europe or FCC part 15 in the US. It is well known that frequencies below 40 kHz show several problems in typical LV power lines, such as low impedance, back ground noise, and unpredictable time-variance caused by use of household appliances, etc. Consequently, the PRIME PHY specification uses the frequency band from 41.992 kHz to 471.6796875 kHz.

This range is divided into eight channels, which may be used either as single independent channels or "NCH" of them concurrently as a unique transmission/reception band. OFDM modulation is specified in each channel, with signal loaded on 97 equally spaced subcarriers, transmitted in symbols of 2240 microseconds, of which 192 microseconds includes cyclic prefix. Adjacent channels are always separated by guard intervals of fifteen subcarriers (7.3 kHz). Differential modulations are used, with one of three possible constellations: DBPSK, DQPSK, or DBPSK. An additive scrambler is used to avoid the occurrence of long sequences of identical bits. ½ rate convolutional coding and repetition code may be used along with bit interleaving. The convolutional coding, the bit interleaving, and/or the repetition code may be disabled by higher layers if the channel is good enough and higher throughputs are needed.

In order to better understand embodiments of the invention, an overview of IEEE 1901.2 will now be described. Additional details may be found in various IEEE documents. A more detailed overview is provided in "An Overview, History, and Formation of IEEE 1901.2 for Narrowband OFDM PLC", Jul. 2, 2013, which is incorporated by reference herein.

Details on PHY building blocks have been presented in various IEEE publications. The ultimate result is now a universal PHY structure for LF-NB PLC. The fundamental PHY elements in the transceiver start with the scrambler. The scrambler's function is to randomize the incoming data. Both G3-PLC and PRIME utilize the same generator polynomial, as illustrated in equation (1).

$$s(x)=x^7+x^4+1 \tag{1}$$

Two levels of error correction follow, starting with a Reed-Solomon (RS) encoder where typically data from the scrambler is encoded by shortened systematic Reed-Solomon (RS) codes using Galois Field (GF). The second level of error correction, employed by both G3-PLC and PRIME, uses a ½ rate convolutional encoder with constraint rate K=7. The convolutional encoder is followed by a two-dimensional (time and frequency) interleaver. Together these blocks significantly improve robustness and overall system performance in the presence of noise.

Following the FEC (forward error correction) block is the OFDM modulator. The modulation technique of PRIME and G3-PLC was selected to be used in IEEE 1901.2. The defined modulator describes the modulation (BPSK, QPSK, 8PSK, etc.); the constellation mapping; the number of repetitions (4, 6, etc.); the type of modulation (differential, coherent); the frequency domain pre-emphasis; OFDM generation (IFFT, with cyclic prefix); and windowing.

Structure of the physical frames is defined according to the fundamental system parameters, including the number of FFT points and overlapped samples, the size of cyclic prefixes, the number of symbols in the preamble, and the sampling frequency. The physical layer supports two types of frames: the data frame and the ACK/NACK frame. Each frame starts with a preamble used for synchronization and detection, as well as automatic gain control (AGC) adaptation. The preamble is followed by data symbols allocated to the frame control header (FCH) with the number of symbols depending on the number of carriers used by the OFDM modulation.

The FCH is a data structure transmitted at the beginning of each data frame. It contains information regarding modulation and the length of the current frame in symbols. The FCH also includes a frame control checksum (CRC, or cyclic redundancy check), which is used for error detection. The size of the CRC depends on the frequency band being utilized.

The PHY layer includes an adaptive tone mapping (ATM) feature to optimize maximum robustness. The added ATM feature is implemented first by estimating the SNR of the received signal subcarriers (tones), and then adaptively selecting the usable tones and the optimum modulation and coding type to ensure reliable communication over the powerline channel. Tone mapping also specifies the power level for the remote transmitter and the gain values to be applied for the various sections of the spectrum. The per-carrier quality measurement enables the system to adaptively avoid transmitting data on subcarriers with poor quality. Using a tone map indexing system, the receiver understands which tones are used by the transmitter to send data and which tones are filled with dummy data to be ignored. The goal of the ATM is to achieve the greatest possible throughput under the given channel conditions between the transmitter and the receiver.

A transmission protocol between the MAC and the PHY layer includes different data primitives accessible between the MAC and PHY layers. Several primitives may be provided. A PD-DATA.request primitive is generated by a local MAC sublayer entity and issued to its PHY entity to request the transmission of a PHY service data unit (PSDU). A PD-DATA.confirm primitive confirms the end of the transmission of a PSDU from the local PHY entity to a peer PHY entity. A PD-DATA.indication primitive indicates the transfer of a PSDU from the PHY to the local MAC sublayer entity. The PHY layer may include a management entity called the PLME (physical layer management entity). The PLME provides layer-management service interfaces functions. It is also responsible for maintaining the PHY information base.

The MAC layer is an interface between the logical link control (LLC) layer and the PHY layer. The MAC layer regulates access to the medium by using CSMA/CA (carrier sense, multiple access with collision avoidance). It provides feedback to upper layers in the form of positive and negative acknowledgements (ACK or NACK) and also performs packet fragmentation and reassembly. Packet encryption/decryption is carried out by the MAC layer as well.

A tone map response MAC command may be provided to utilize adaptive tone mapping. The MAC sublayer generates a tone map response command if the tone map request (TMR) bit of a received packet segment control field is set. This means that a packet originator has requested tone map information from a destination device. The destination device must estimate this particular communication link between two points and report the optimal PHY parameters. The tone map information includes the index associated with PHY parameters: the number of used tones and allocation (tone map), the modulation mode, the TX power control parameters, and the link quality indicator (LQI).

The Physical Layer (PHY) may operate in the frequency range of less than 500 kHz and provide up to 500 kbps PHY channel rate. An IEEE 1901.2 device may send MAC data frames that are greater in length then 400 bytes, while a G3 device is limited to a maximum of 400 bytes.

Figure 5:
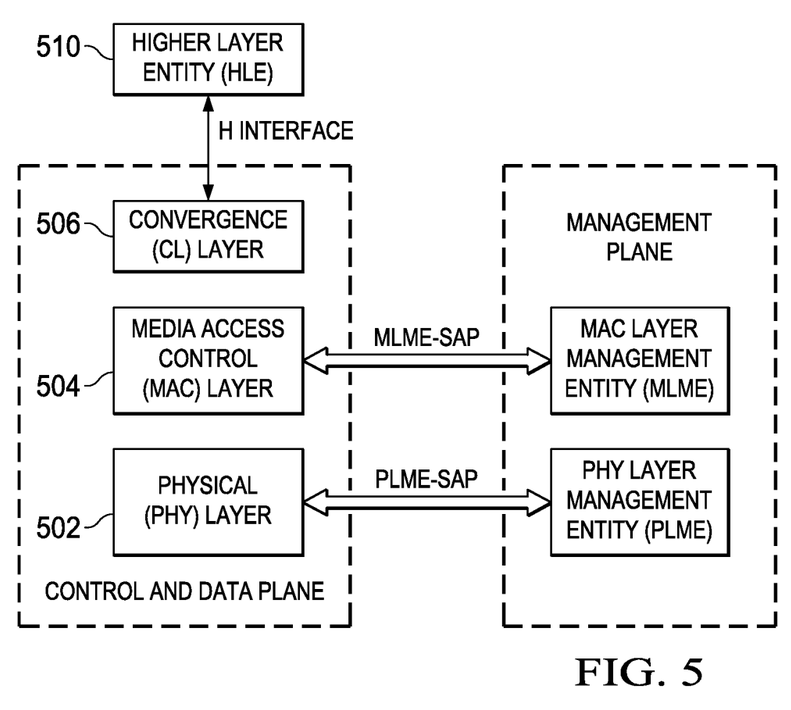
FIG. 5 is an architectural diagram of a power line communication system, illustrating the PHY and MAC layers.

FIG. 5 is an architectural diagram of a power line communication system, illustrating the PHY (physical) layer 502 and MAC (media access control) layer 504 used for data packet management as defined by the PRIME specification version R1.4. Similar architectural structures are used in the G3-PLC and IEEE 1901 standards. A brief description of the architecture is described herein. A detailed description is provided by "Specification for PoweRline Intelligent Metering Evolution" Revision R1.4, which is incorporated by reference herein.

The Higher Layer Entities (HLEs) 510 above the Host (H) Interface may be bridges, applications, or servers that provide off-chip services to clients below the H Interface. The PLC communicating standards define two planes: the control and data plane, and the management plane. The data plane provides a traditional layered approach with a Convergence Layer (CL) 506, a MAC layer 504, and a PHY layer 502. Although part of the control plane may be in all stations, the Central Coordinator (CCo) entity may be active in only one station in a single PLC network, referred to as the "base node."

The CL 506 classifies traffic associating it with its proper MAC connection; this layer performs the mapping of any kind of traffic to be properly included in MAC protocol data units (MPDU). It may also include header compression functions. Several service specific convergence layers (SSCS) may be defined to accommodate different kinds of traffic into MPDUs.

The MAC layer 504 provides core MAC functionalities of system access, bandwidth allocation, connection establishment/maintenance and topology resolution.

The PHY layer 502 transmits and receives MPDUs between Neighbor Nodes using OFDM. OFDM provides an inherent adaptability in the presence of frequency selective channels, which are common but unpredictable, due to narrowband interference or unintentional jamming. It has robustness to impulsive noise, resulting from the extended symbol duration and use of forward error correction (FEC), and has a capacity for achieving high spectral efficiencies with simple transceiver implementations. The PHY specification also employs a flexible coding scheme. The PHY data rates may be adapted to channel and noise conditions by the MAC.

Figure 6:
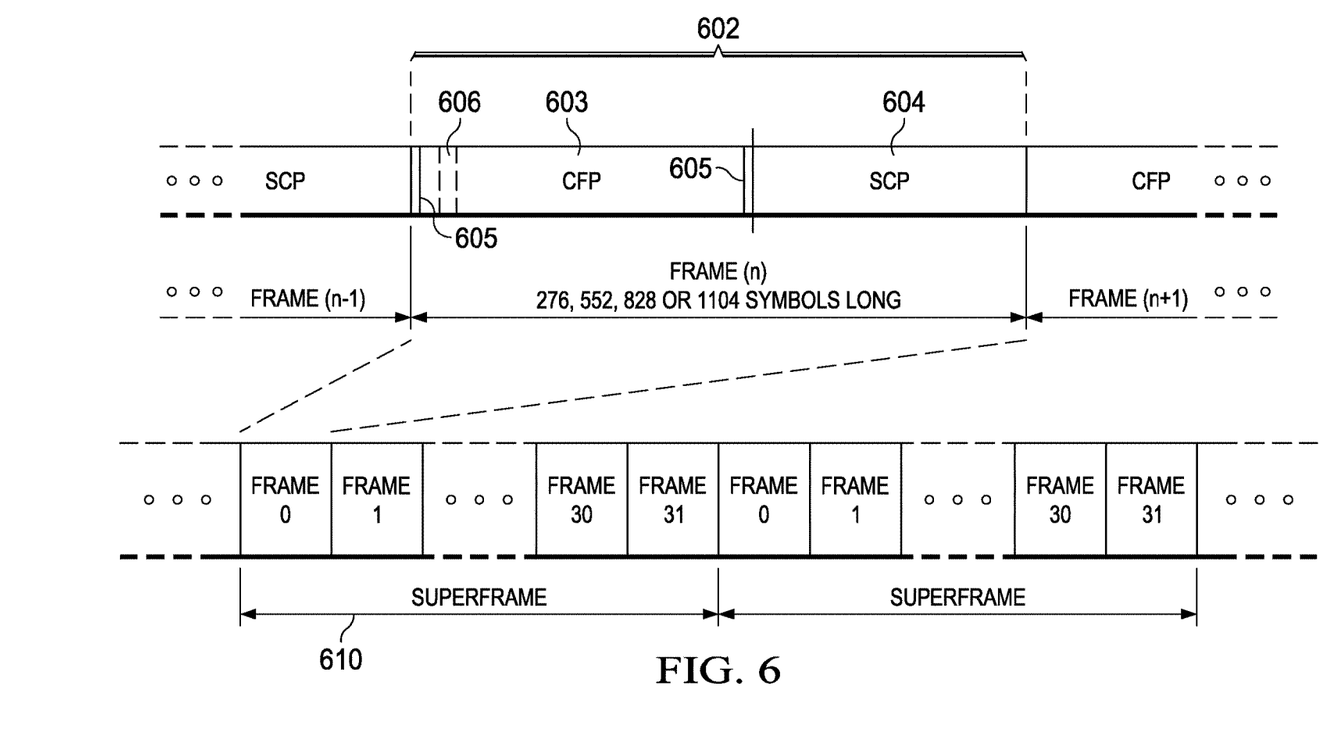
FIG. 6 is an illustration of a frame and superframe structure used by the PRIME standard.

FIG. 6 is an illustration of a frame 602 and superframe 610 structure used by the PRIME specification. Time is divided into composite units of abstraction for channel usage, called MAC Frames. A frame broadly includes of two parts: a Contention Free Part (CFP) 603, and a Shared Contention Period (SCP) 604. The CFP is the first part of a frame. Only devices that are explicitly granted permission by the Base Node are allowed to transmit in CFP. Devices allocated CFP time are also given start and end time between which they need to complete their transmission and they are not allowed to use the channel for the rest of the CFP duration.

The SCP forms the second half of a frame following the CFP where devices are free to access the channel, provided they comply with CSMA CA algorithm defined in the specification before transmitting their data; and they respect SCP boundaries within a MAC Frame, together with the corresponding guard-times.

A guard-time 605 of macGuardTime is provided at both the beginning and end of CFP. The length of CFP communicated in a beacon 606 is inclusive of its respective guard-times.

In order to facilitate changes to SCP and CFP times in large networks where beacons may not be transmitted in every frame, a notion of super-frame is defined. A super-frame is comprised of MACSuperFrameLength number of frames. Each frame is numbered in modulo-MACSuperFrameLength manner so as to propagate information of super-frame boundary to every device in the sub-network.

The length of a frame, macFrameLength, together with those of SCP and of CFP are all variable and are defined by Base Node depending on factors such as channel conditions, network size etc.

Each frame includes multiple fields, referred to as "protocol data units". At the physical layer, there are PHY protocol data units (PPDU) and at the MAC layer there are MAC protocol data units (MPDU).

Base Nodes

Base Nodes are primarily responsible for setting up and maintaining a Sub-network. The Base Node and all Switch Nodes in the Sub-network broadcast beacons at fixed intervals of time. The Base Node transmits at least one beacon per super-frame. Switch Nodes transmit beacons with a frequency prescribed by the Base Node at the time of their promotion, which would also be at-least one beacon per super-frame.

The Base Node maintains a table of all the Switch Nodes on the Sub-network and allocates a unique SID to new incoming requests. Upon reception of multiple promotion requests, the Base Node can, at its own discretion, reject some of the requests. Likewise, the Base Node is responsible for demoting registered Switch Nodes. The demotion may either be initiated by the Base Node (based on an implementation-dependent decision process) or be requested by the Switch Node itself.

The Base Node receives Registration requests from all new Nodes trying to be part of the Sub-network it manages. The Base Node processes each Registration request it receives and responds with an accept or reject message. When the Base Node accepts the registration of a Service Node, it allocates a unique NID to it to be used for all subsequent communication on the Sub-network. Likewise, the Base Node is responsible for deregistering any registered Service Node. The deregistration may be initiated by the Base Node (based on an implementation-dependent decision process) or requested by the Service Node itself.

Network Detection

When a PRIME R1.4 node is added to a network it may receive packets with PHY frame format A, B and BC as described in the PRIME R1.4 specification. The decoded payload information is passed to the MAC layer. The node needs to know which network it is connected to in order to correctly interpret the frame packets and to register with the network. Currently, two versions of the PRIME network are in use: PRIME R1.3.6 and PRIME R1.4 GF.

One way for a device to know which network it is being added to is for it to be manually configured by a system administrator or other entity that is using or setting up the network.

Another way may be to assume that a new device will operate in the backward compatible mode. However, in this case a device may not be able to take advantage of all of the benefits of the R1.4 specification.

A technique will now be disclosed to detect which version of PRIME is operating in the network. By detecting the version of the network, the device may configure itself to operate correctly as a R1.3.6 device or a R1.4 device and thereby take full advantage of the R1.4 capabilities. This allows one type of node to support multiple PRIME specification modes.

Figure 7:
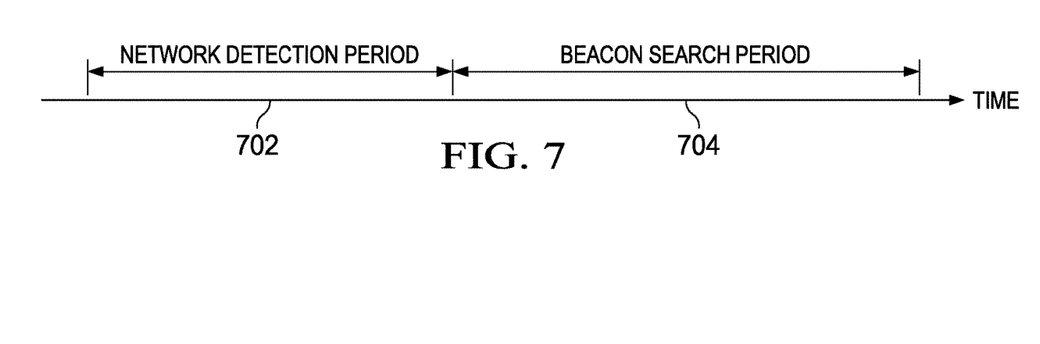
FIG. 7 is a time plot illustrating a network detection period.

FIG. 7 is a time plot illustrating a network detection period 702 and a beacon search period 704. The PRIME specification defines a beacon search period 704 that is used by devices to detect beacons in order to register to the network. Embodiments of this disclosure may add an additional network detection period 702 for detecting the specification mode by parsing multiple beacons received over the network during network detection period 702. Detection period 702 may be as short as two superframe periods, for example. The length of frames and superframes are configurable, as defined by the PRIME specification. A maximum length superframe may be 32 frames in duration, where each frame may have up to 1104 symbols that are each 2240 microseconds long, including a short cyclic prefix. Thus, a superframe may be as long as 0.817 seconds. Therefore, the detection period should be at least approximately two seconds long.

Figure 8:
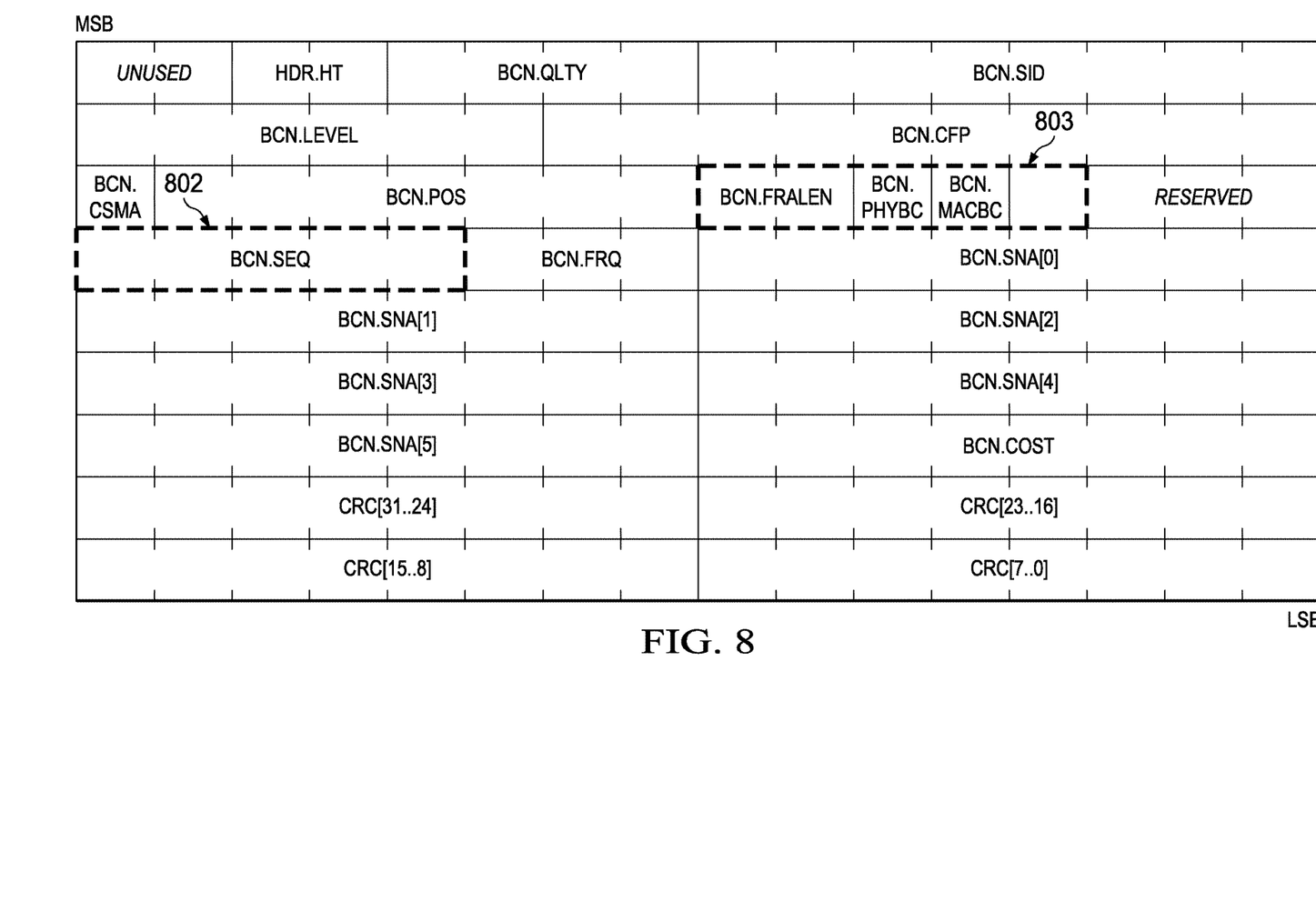
FIG. 8 is an illustration of a PRIME R1.4 beacon.
Figure 9:
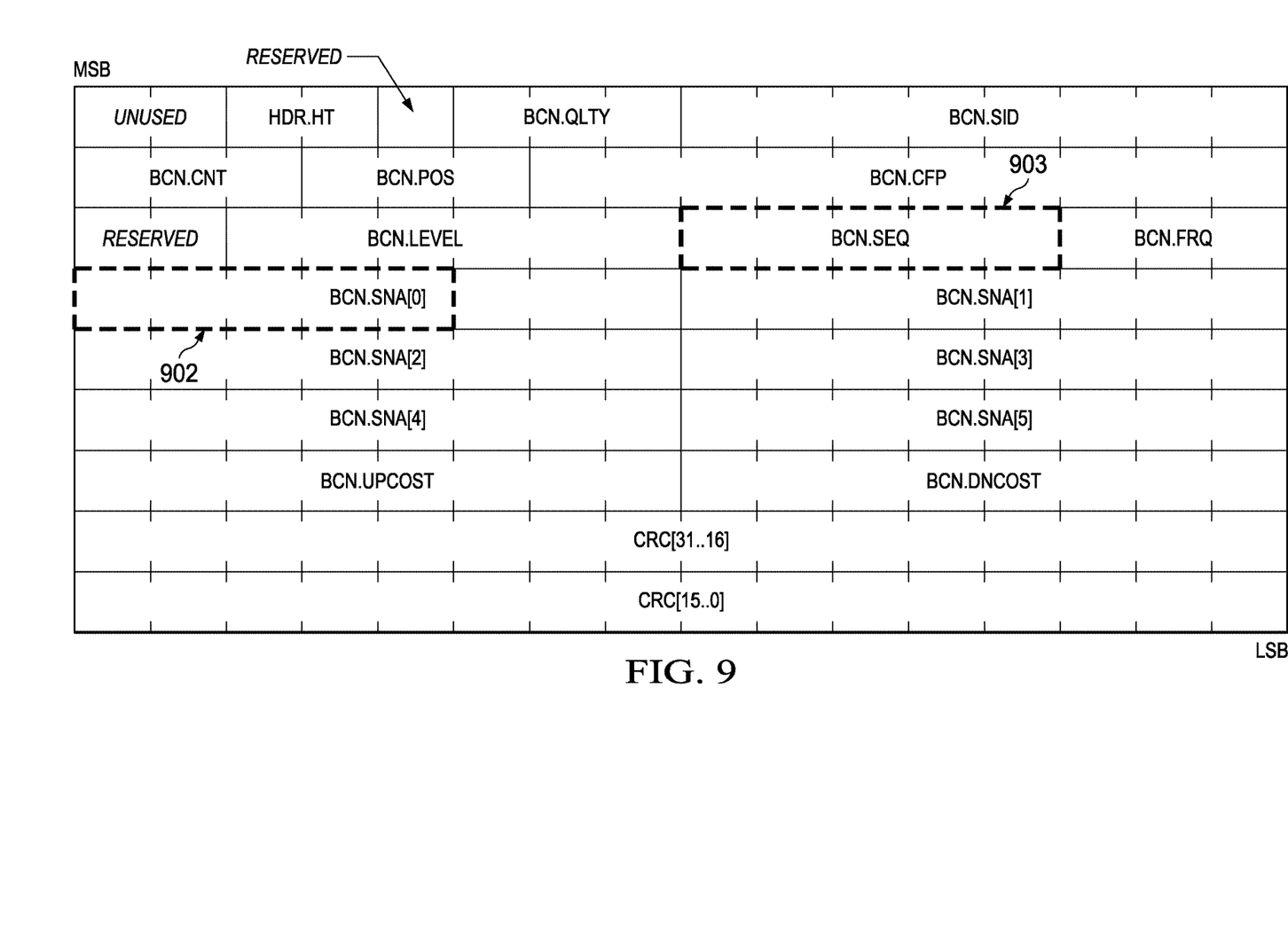
FIG. 9 is an illustration of a PRIME R1.3.6 and an R1.4BC beacon.

FIG. 8 is an illustration of a PRIME R1.4 beacon and FIG. 9 is an illustration of a PRIME R1.4BC beacon that is backward compatible with R1.3.6. During detection period 702, referring back to FIG. 7, a detection process executed on the device may parse a predefined portion of the beacon in order to determine which type beacon it is.

For example, a five bit beacon sequence value (BCN.SEQ) 802 is located in the seventh byte of an R1.4 beacon. The beacon sequence value is iterated for each consecutive beacon. A 48 bit subnetwork identifier (BCN.SNA) is located in the seventh to twelfth bytes of an R1.3.6 beacon. The BCN.SNA value identifies the switch or base node that is transmitting the beacon and therefore does not change from beacon to beacon. Thus, by parsing the seventh byte, or even just the five bits of the seventh byte as indicated at 802 in FIGS. 8 and 902 in FIG. 9, a device may be able to determine which type of beacon is being transmitted and thereby determine which type of network it is connected to.

In a similar manner, the sixth byte of an R1.4 beacon contains a length of frame field (BCN.FRA), a PHY backwards compatibility mode bit (BCN.PHYBC), a MAC backwards compatibility mode bit (BCN.MACBC), and a reserved field that is set to 0. Thus, the sixth byte of an R1.4 beacon has a fixed value in consecutive beacons. Conversely, the first five bits of the sixth byte of an R1.4BC and R1.3.6 beacon contains a beacon sequence value (BCN.SEQ) that is iterated for each consecutive beacon. Thus, by parsing the sixth byte, or even just the five bits of the sixth byte as indicated at 803 in FIGS. 8 and 903 in FIG. 9, a device may be able to determine which type of beacon is being transmitted and thereby determine which type of network it is connected to.

Figure 10:
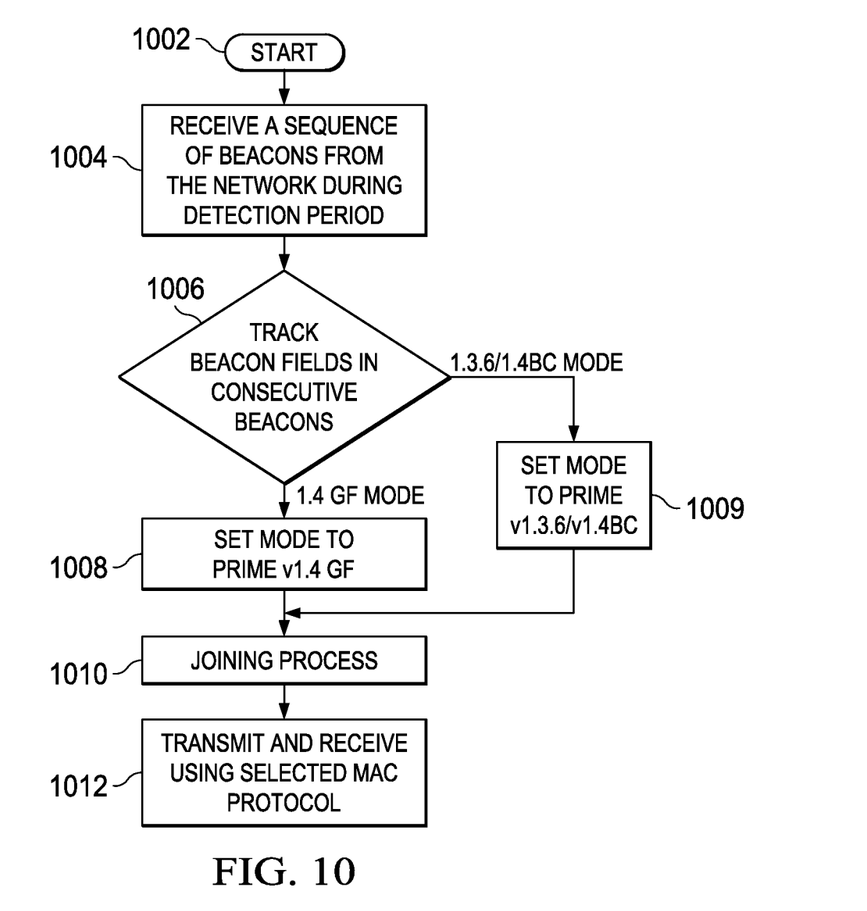
FIG. 10 is a flow chart illustrating detection of network type.

FIG. 10 is a flow chart illustrating detection of network type, as described above in more detail. This method is performed each time a device connected to a network is started 1002. For example, this may be performed each time the node receives power and begins to operate.

Processing logic on the node may then receive 1004 a sequence of beacons from the network during an initial period of time referred to herein as the network detection period, as illustrated by detection period 702 in FIG. 7. As mentioned earlier, there may be a beacon PPDU at the beginning of each frame, or at least one at the beginning of each superframe.

Processing logic on the node may parse 1006 each beacon as it is received and track the contents of one or more predetermined fields, such as a field in the sixth byte as indicated by 803 in FIG. 8 or a field in the seventh byte as indicated by 802 in FIG. 8. Depending on which field is tracked, the manner in which the contents of the field vary or remain constant from beacon to beacon may be used to determine which type of beacon is being transmitted and thereby which type of network the device is connected to.

Once the network type is determined 1006, the node may set itself to operate in PRIME R1.4 green field mode 1008, or in PRIME R1.3.6/R1.4BC mode 1009. Setting the mode of operation of the node may include selecting software to execute that uses a MAC layer protocol tailored for PRIME R1.3.6 or for PRIME R1.4, for example.

Once the PRIME specification mode is detected, the selected MAC layer goes into normal operation during beacon search period 704, referring again to FIG. 7, to register the device and join 1010 the node with the network using the procedure defined by the PRIME specification being used by the network.

Once the node has joined the network, it may then transmit and receive 1012 data using the selected MAC protocol.

In this manner, a single device may be manufactured and preloaded with software that is configured to support multiple MAC protocols in order to allow the device to operate in an optimum manner. For example, when the device detects that it is connected to a PRIME R1.4 network, then it may use all of the R1.4 enhancements. Alternatively, when the device detects that it is connected to a PRIME R1.3.6 network, then it may operate in the reduced function backward compatible mode.

Figure 11:
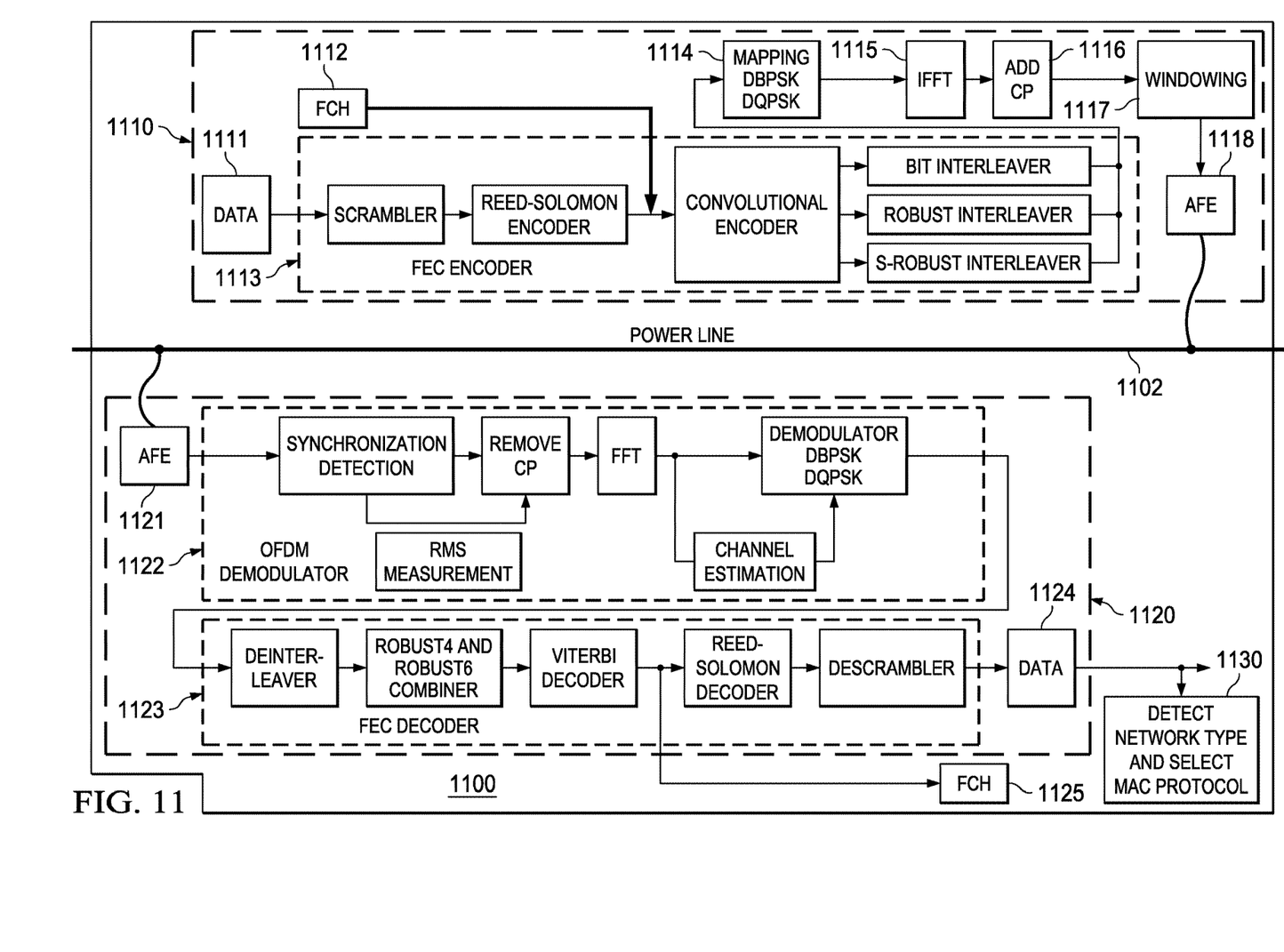
FIG. 11 illustrates a block diagram of an exemplary low cost, low power multi-protocol PRIME device.

FIG. 11 is a functional block diagram of an exemplary low cost, low power PRIME R1.3.6 and R1.4 compatible device 1100 illustrating an OFDM transmitter 1110 and receiver 1120 for use in a power line communication node for PLC over a power line 1102. The various functions illustrated may be performed in dedicated hardware or by executing software from memory located in the integrated circuit by one or more processors located within the integrated circuit, for example.

As discussed above, the power line channel is very hostile. Channel characteristics and parameters vary with frequency, location, time and the type of equipment connected to it. The lower frequency regions from 10 kHz to 200 kHz used in G3 PLC and in IEEE 1901.2 are especially susceptible to interference. Furthermore, the power line is a very frequency selective channel. Besides background noise, it is subject to impulsive noise often occurring at 50/60 Hz, and narrowband interference and group delays up to several hundred microseconds.

As described in more detail above, OFDM is a modulation technique that can efficiently utilize the limited bandwidth specified by CENELEC and IEEE 1901.2, and thereby allows the use of advanced channel coding techniques. This combination facilitates a very robust communication over a power line channel.

The CENELEC bandwidth is divided into a number of sub-channels, which can be viewed as many independent PSK modulated carriers with different non-interfering (orthogonal) carrier frequencies. Convolutional and Reed-Solomon coding provide redundancy bits allowing the receiver to recover lost bits caused by background and impulsive noise. A time-frequency interleaving scheme may be used to decrease the correlation of received noise at the input of the decoder, providing diversity.

Data 1111 and a frame control header 1112 are provided by an application via a media access layer (MAC) of the communication protocol. An OFDM signal is generated by performing IFFT (inverse fast Fourier transform) 1115 on the complex-valued signal points that are produced by differentially encoded phase modulation from forward error correction encoder 1113 using Reed Solomon encoding. Tone mapping 1114 is performed to allocate the signal points to individual subcarriers. An OFDM symbol is built by appending a cyclic prefix (CP) 1116 to the beginning of each block generated by IFFT 1115. The length of a cyclic prefix is chosen so that a channel group delay will not cause successive OFDM Symbols or adjacent sub-carriers to interfere. The OFDM symbols are then windowed 1117 and impressed on power line 1102 via analog front end 1118. AFE 1118 provides isolation of transmitter 1110 from the 50/60 Hz power line voltage.

Similarly, receiver 1120 receives OFDM signals from power line 1102 via AFE 1121 that isolates receiver 1120 from the 50/60 HZ power line voltage. OFDM demodulator 1122 removes the CP, converts the OFDM signal to the time domain using FFT (Fast Fourier Transform), and performs demodulation of the phase shift keyed (DBPSK, DQPSK) symbols. FEC decoder 1123 performs error correction using Reed Solomon decoding and then descrambles the symbols to produce received data 1124. Frame control header 1125 information is also produced by FEC decoder 1120, as defined by the PRIME specifications.

As described above in more detail, the type of network to which the device is connected may be detected 1130 by tracking one or more data fields within a sequence of beacons received during an initial network detection period. Once the network type is detected, a corresponding MAC protocol may be used by receiver 1110 and transmitter 1120.

Transmitter 1110 and receiver 1120 may be implemented using a digital signal processor (DSP), or another type of microprocessor, that is executing control software instructions stored in memory that is coupled to the microprocessor, for example, to perform FEP encoding, mapping and OFDM modulation, demodulation and FEP decoding. In other embodiments, portions or all of the transmitter or receiver may be implemented with hardwired control logic, for example. Transmitter 1110 and receiver 1120 may be fabricated using known or later developed semiconductor techniques in a single integrated chip (IC), for example. The analog front ends 1118, 1121 require analog logic and isolation transformers that can withstand the voltage levels present on the power line.

Other Embodiments

In the description herein, some terminology is used that is specifically defined in the PRIME, G3 and IEEE 1901.2 standards and/or is well understood by those of ordinary skill in the art in PLC technology. Definitions of these terms are not provided in the interest of brevity. Further, this terminology is used for convenience of explanation and should not be considered as limiting embodiments of the invention to the PRIME, G3, and IEEE 1901.2 standards. One of ordinary skill in the art will appreciate that different terminology may be used in other encoding standards without departing from the described functionality.

While an embodiment based on PRIME R1.3.6 and R1.4 is described herein, the techniques described herein may be applied to later versions of PRIME specifications, as well as to other G3 and IEEE 1901.2 systems to allow a single device to detect what type of network it is connected to and to thereby self configure, select a protocol, and operate using one of multiple protocol versions provided within the device Embodiments of the receivers and transmitters and methods described herein may be provided on any of several types of digital systems: digital signal processors (DSPs), general purpose programmable processors, application specific circuits, or systems on a chip (SoC) such as combinations of a DSP and a reduced instruction set (RISC) processor together with various specialized accelerators. A stored program in an onboard or external (flash EEP) ROM or FRAM may be used to implement aspects of the signal processing.

The techniques described in this disclosure may be implemented in hardware, software, firmware, or any combination thereof. Various combinations of hardware and/or software state machines may be used. If implemented in software, the software may be executed in one or more processors, such as a microprocessor, application specific integrated circuit (ASIC), field programmable gate array (FPGA), software state machines, or digital signal processor (DSP), for example. The software that executes the techniques may be initially stored in a computer-readable medium such as a flash drive, a compact disc (CD), a diskette, a tape, a file, memory, or any other computer readable storage device and loaded at a manufacturing site for execution in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope and spirit of the invention.

What is claimed is:

1. A method for operating a communication device in a network, the method comprising:
   receiving a stream of frames from the network by the communication device, in which each frame includes one or more beacon packets;
   monitoring a preselected field within each beacon packet of a sequence of beacon packets, wherein each beacon packet includes a plurality of bytes and the preselected field is contained within a same byte of each beacon packet of the sequence of beacon packets, wherein the preselected field within consecutive beacon packets in the sequence of beacon packets varies in a first known manner for a first protocol and in a second known manner for a second protocol, and wherein the preselected field is monitored during a network detection period to identify a communication protocol used by the network;
   in response to the monitoring of the preselected field within each beacon packet of the sequence of beacon packets during the network detection period, identifying the communication protocol as the first protocol when the preselected field varies in the first known manner and as the second protocol when the preselected field varies in the second known manner; and
   joining the communication device to the network using the identified communication protocol to transmit and receive data.

2. The method of claim 1, in which the preselected field is changed in consecutive beacon packets in the first protocol and in which the preselected field is a fixed value in consecutive beacon packets in the second protocol.

3. The method of claim 1, in which the first protocol conforms to Specification for PoweRline Intelligent Metering Evolution revision 1.4 and in which the second protocol conforms to Specification for PoweRline Intelligent Metering Evolution revision 1.3.6.

4. The method of claim 1, wherein the network detection period is a time period for identifying the communication protocol.

5. The method of claim 4, wherein the network detection period is in addition to a beacon search period, the beacon search period used for detecting beacons for registering to the network.

6. The method of claim 5, wherein the network detection period occurs at a time period before a time period corresponding to the beacon search period.

7. The method of claim 1, wherein the same byte containing the preselected field is a sixth byte of each beacon packet of the sequence of beacon packets, wherein a value of the preselected field contained within the sixth byte changes between successive beacon packets for Specification for PoweRline Intelligent Metering Evolution revision 1.3.6 and the value of the preselected field contained within the sixth byte remains same between successive beacon packets for Specification for PoweRline Intelligent Metering Evolution revision 1.4.

8. The method of claim 1, wherein the same byte containing the preselected field is a seventh byte of each beacon packet of the sequence of beacon packets, wherein a value of the preselected field contained within the seventh byte changes between successive beacon packets for Specification for PoweRline Intelligent Metering Evolution revision 1.4 and the value of the preselected field contained within the seventh byte remains same between successive beacon packets for Specification for PoweRline Intelligent Metering Evolution revision 1.3.6.

9. A power line communication (PLC) device comprising:
   an application processor coupled to a memory;
   a receiver coupled to the application processor, wherein the receiver comprises an analog front end configured to receive orthogonal frequency division multiplexing (OFDM) symbols from a power line coupled to a network, and a demodulator configured to demodulate the OFDM symbols to produce data, the receiver configured to receive a stream of frames from the network by the PLC device, in which each frame includes one or more packets of a first type;
   a media access control (MAC) identification logic, controlled by the application processor, configured to monitor a preselected field within each first type packet of a sequence of first type packets, wherein each first type packet includes a plurality of bytes and the preselected field is contained within same byte of each first type packet of the sequence of first type packets, wherein the preselected field within consecutive first type packets varies in a first known manner for a first protocol and in a second known manner for a second protocol, and to identify a communication protocol used by the network as the first protocol when the preselected field varies in the first known manner and as the second protocol when the preselected field varies in the second known manner, the preselected field being monitored during a network detection period; and control logic controlled by the application processor configured to cause the communication device to join the network and to use the identified communication protocol to interpret data received by the receiver.

10. The PLC device of claim 9, in which the preselected field is changed in consecutive first type packets in the first protocol and in which the preselected field is a fixed value in consecutive first type packets in the second protocol.

11. The PLC device of claim 9, in which the first type packet is a beacon packet.

12. The PLC device of claim 11, in which the first protocol conforms to Specification for PoweRline Intelligent Metering Evolution revision 1.4 and in which the second protocol conforms to Specification for PoweRline Intelligent Metering Evolution revision 1.3.6.

13. The PLC device of claim 9, in which the application processor is configured to execute instructions stored in the memory to provide the MAC identification logic.

14. The PLC device of claim 9, wherein the network detection period is a time period for identifying the communication protocol, the network detection period is in addition to a beacon search period, the beacon search period used for detecting beacons for registering to the network, the network detection period occurs at a time period before a time period corresponding to the beacon search period.

* * * * *